Dec. 11, 1962   B. BARÉNYI   3,068,041
END WALL STRUCTURES FOR MOTOR VEHICLES
Filed Aug. 10, 1959
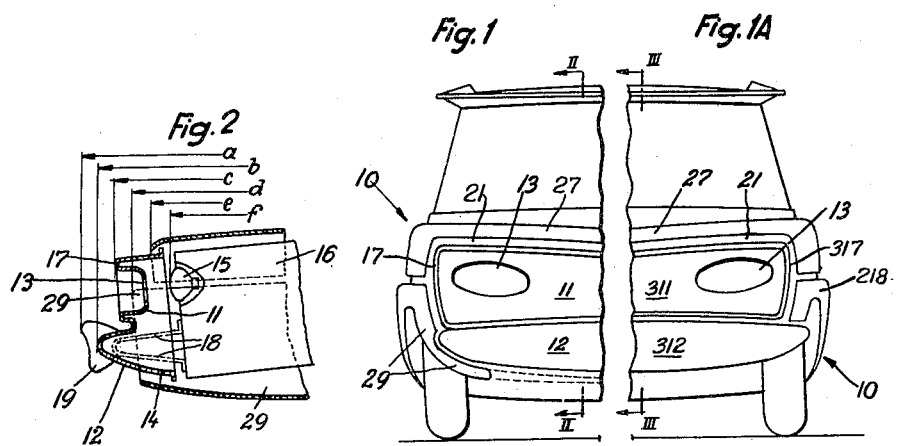
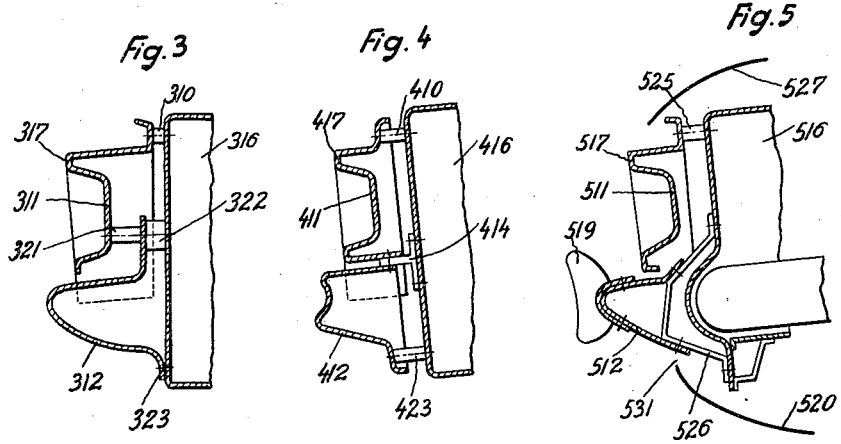
Inventor
BÉLA BARÉNYI
BY Dickey, Craig and Freudenberg
Attorneys

United States Patent Office 3,068,041
Patented Dec. 11, 1962

3,068,041
END WALL STRUCTURES FOR MOTOR VEHICLES
Béla Barényi, Stuttgart-Vaihingen, Germany, assignor to Daimler-Benz Aktiengesellschaft, Stuttgart-Unterturkheim, Germany
Filed Aug. 10, 1959, Ser. No. 832,678
Claims priority, application Germany Aug. 16, 1958
7 Claims. (Cl. 296—28)

My invention relates to a motor vehicle body and, more particularly, to an end wall of the body of a car.

It is the object of my invention to provide an improved end wall of simplified construction which may be easily manufactured at low cost.

Further objects of my invention are to provide an improved end wall of a motor vehicle which is unsensitive to slight impacts as are liable to occur in congested traffic conditions owing to collisions; to provide an improved car body having front portions and/or rear portions which will be damaged less frequently and will not be damaged at all by impacts or blows of limited intensity; to provide an improved car body in which the more sensitive elements, such as the head lights and tail lights, are disposed in sheltered position and, therefore, are less liable to be damaged by collisions and also are less liable to blind the driver driving through fog by illuminating the fog as the beam of light is screened in upward direction by my improved end wall; and to provide the body with elements bracing the end wall against impacts, such elements being capable of deformation and of easy repair.

Further objects of my invention will appear from a detailed description of a number of embodiments thereof following hereinafter with reference to the drawings. It is to be understood, however, that my invention is in no way restricted to such details but is capable of numerous modifications within the scope of the appended claims and that the terms and phrases used in such detailed description have been chosen for the purpose of explaining rather than that of restricting or limiting the invention.

In the accompanying drawings:

FIG. 1 is a partial front view or rear view of a motor vehicle illustrating one embodiment, FIG. 1A is a similar partial view illustrating a different embodiment and is of the other side of a vehicle than that shown in FIGURE 1, FIG. 2 is a vertical longitudinal section being taken along the plane indicated by the dash-dotted line II—II of FIG. 1, FIG. 3 is a vertical longitudinal section taken along the plane indicated by the line III—III of FIG. 1A, FIG. 4 is a sectional view similar to that of FIGS. 2 and 3 of a third embodiment of my invention, and FIG. 5 is a vertical longitudinal view similar to that of FIGS. 2, 3, and 4 of another modification of my invention.

In the embodiment of my invention shown in FIG. 1 the end wall of the body 10 of a car which may be the front end wall or the rear end wall has an upper field or upper portion 11 and a lower field or lower portion 12 which are preferably formed by an integral element of a suitable sheet material. The upper field is provided with a pair of openings 13 spaced at equal distances from the central vertical longitudinal plane. These openings are provided for the head lights or the tail lights or signal lights. As shown in FIG. 2 lamps 15 are provided in sheltered position inside of the body in alignment with the openings 13 and are mounted on brackets carried by suitable supporting body elements as indicated as 16. Owing to this disposition of the lamps 15 they are not liable to be damaged in slight collisions which may deform the end wall 11, 12. Moreover, when the car is driven through fog the driver's field of view will not be blocked above the level of the lamps 15 by illumination of the fog as the light beam is so screened by the field 11 of the end wall as to be substantially confined to the space below the level of the upper margin of the end wall. Where the lamp 15 is used as a signal lamp, for instance for a stop light, the disposition shown offers the advantage that the lamp is effectively shielded from sunlight and, therefore, will be easily observed by the driver of a following vehicle even if this driver should be blinded by sunlight.

Preferably, the upper field 11 is formed with a surrounding marginal bead 17 which projects forwardly beyond the vertical surface of field 11 in which the opening 13 is provided. Within the lower field 12 the end wall is preferably formed with a convex zone which protrudes forwardly beyond the bead 17 to form bumper means thereon and is preferably co-extensive with the full length of the field 12. The sheet material of which the fields 11 and 12 are formed is preferably a polymerized synthetic material capable of elastic deformation. Therefore, the convex zone of the end wall provided within the field 12 will automatically spring back to its original shape after it has been indented by any impact caused by a slight collision for instance. As the end wall owing to the elastic nature of its material could not afford effective protection to the elements of the car disposed inside of the body behind the end wall, I prefer to reinforce the bumper portion of the field 12 by an internal bracing element which will take up the thrust in event of an elastic deformation of field 12. In the embodiment illustrated in FIG. 2 this bracing element is formed by an elongated hollow sheet metal body 18 having a wedge-shaped cross-sectional profile and is mounted on the supporting structure 16 of the body in such a position as to extend into the convex forwardly protruding bumper portion of field 12, as will appear from FIG. 2. Preferably, the sheet metal member 18 extends throughout the entire length of the bumper portion of field 12 and its sheet metal has such a limited strength that upon deformation in a collision it may be readily restored to its original shape. This restoration does not require any particular care as the bracing member 18 is hidden from view by the end wall. In a collision exerting a blow upon the bumper portion of the end wall directed towards the center of the body this bumper portion which may be provided with a pair of bumper fittings 19 will be indented so as to engage the bracing member 18. When the energy of the blow exceeds a certain limit the bracing member 18 will be deformed. After the energy impact has been expended the end wall 11, 12 will automatically spring back to its original shape and position. As a rule, the bracing member 18 can be easily straightened out and restored to its original shape by suitable tools for further use. If necessary, however, the bracing member 18 may be easily exchanged for a new one. This work can be easily carried out by the owner of the car as it does not require the skill of a mechanic.

In FIGS. 3, 4, and 5 I have illustrated modified embodiments of my invention. In the embodiment shown in FIG. 3 the upper field 311 and the lower field 312 of the end wall are formed by separate wall members, the member 311 being attached to the supporting structure 316 of the body by suitable attaching means 310 and being attached to the lower wall member 312 by suitable attaching means 321. The lower member 312 is attached to the supporting member 316 of the body by means indicated at 322 and 323. The attaching means 310, 321, 322, and 323 may be formed by threaded bolts combined with suitable spacer sleeves of rubber or the like. These attaching means are preferably provided at points located one above the other to thereby ensure a high resistance against undesirable upward or downward flexures of the end wall and to limit vibrations of the end wall in vertical direction to a minimum.

In the embodiment of my invention illustrated in FIG. 4 the end wall is likewise composed of a pair of wall members 411 and 412, one of said members forming the upper field and the other one forming the lower field of the end wall. In this embodiment both members 411 and 412 are attached to the supporting structure 416 by a common T-shaped attaching member 414. The upper member 411 is formed with a surrounding bead 417 and has its upper marginal zone fixed to the supporting structure 416 by attaching means 410. The lower marginal portion of the member 412 is fixed to the supporting structure 416 by attaching means 423.

In the embodiment illustrated in FIG. 5 the end wall is likewise composed of a pair of wall members 511 and 512, the member 511 forming the upper field and the member 512 forming the lower field of the end wall. The upper member 511 is mounted upon the supporting structure 516 of the body in a cantilever fashion along its upper marginal portion only by attaching means 525 whereas the lower margin of member 511 is slightly spaced from structure 516 and from the lower member 512, which forms a bumper and may be provided with bumper fittings 519. In this embodiment the members 511 and 512 are individually attached to the supporting structure 516. A pair of spaced brackets 526 is fixed to the supporting element 516 and the lower end wall member 512 is fixed to the brackets 526.

In each of the embodiments described hereinabove the body includes a hood such as 27 in FIG. 1 or 527 in FIG. 5, right and left fenders, such as 29 in FIG. 1 and, if desired, a lower protective sheet metal apron, such as 520 in FIG. 5. These elements surround the open end of the body and my improved wall is inverted in such open end with a gap 21 shown in FIGURES 1 or 1A or gap 531 shown in FIGURE 5 surrounding it.

In the embodiment shown in FIG. 1 and in FIG. 2 the fender 29 is downwardly extended beyond the conventional extent to a point below the bottom margin of field 12 of the end wall. In the embodiment illustrated in FIGURE 1A and in FIG. 3 the side walls of the body including the fenders, such as 29, extend endwise to a point located adjacent to the sides of the upper end wall field 311 and above the lateral ends of the lower end wall field 312. In other words, the end wall member forming the lower field 312 is extended into the range of the outer contour of the body and forms a continuation of the fender 28 at the side edge thereof.

Preferably, the elements described hereinabove with reference to FIG. 2 are so dimensioned that the points exposed in the longitudinal direction follow one another in the sequence shown in FIG. 2 as follows: The bumper formation on the lower field 12 of the end wall extends to a first transverse vertical plane $b$. The bead 17 surrounding the upper field of the end wall extends to a second transverse vertical plane $c$. The fenders 29 extend forwardly to a third transverse vertical plane $d$. The hood 27 extends forwardly to a fourth transverse vertical plane $e$ and the glasses of the lamps 15 extend to a fifth transverse vertical plane $f$. The planes $b$, $c$, $d$, $e$, and $f$ follow one another in the afore-stated sequence in spaced relationship from the end of the vehicle towards the center thereof. If the bumper formation is provided with fittings, such as 19, they extend to a plane $a$ disposed in front of and spaced from the vertical plane $b$.

As a result the more valuable elements of the car which are difficult to disassemble are disposed in sheltered position and less liable to be damaged in any head-on-collision.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle, the combination comprising a body including a hood, fenders and an end wall, said hood and said fenders having terminal edge portions substantially defining an open end of the vehicle, supporting means within said body, said end wall being mounted in said open end upon said supporting means independently of said hood and fenders, said end wall having an upper portion and a lower portion, said upper portion being provided with apertures for lights, a plurality of light fixtures associated with said apertures and spaced a substantial distance behind said apertures, and at least one deformable bracing element provided behind said lower portion of said end wall and extending in the transverse direction of the vehicle over a substantial part of the width of the vehicle for taking up thrust in event of an elastic deformation of said end wall caused by a collision.

2. In a motor vehicle the combination comprising a body including an end wall having an upper portion and a lower portion, said lower portion of said end wall being provided with forwardly projecting bumper formations extending to a first transverse vertical plane of the vehicle, said upper portion of said end wall being formed with a surrounding bead extending to a second transverse vertical plane, said body further including fenders disposed adjacent to said end wall, said fenders extending forwardly to a third transverse vertical plane, said body further including a hood adjacent to said end wall and extending forwardly to a fourth transverse vertical plane, and lamps mounted behind said end wall and extending to a fifth transverse vertical plane, said planes following one another in the afore-stated sequence in spaced relationship from the end of the vehicle towards the center thereof.

3. In a motor vehicle, the combination comprising a body including a hood, fenders and an end wall, body supporting means within said body, said hood and said fenders having terminal edge portions substantially defining an open end of the vehicle, said end wall being mounted telescopingly within said open end upon said body supporting means independently of said hood and fenders, said end wall having an upper portion and a lower portion, said upper portion being provided with apertures for lights, a plurality of light fixtures including transparent cover panes associated with said apertures spaced a substantial distance behind said apertures, and said lower portion including bumper means protruding beyond said upper portion.

4. The combination claimed in claim 3 in which said end wall is composed of a spaced pair of wall members, one of said members forming said upper portion and the other one of said members forming said lower portion.

5. The combination claimed in claim 4 further comprising a supporting element forming part of said body, said members being individually attached to said supporting element.

6. The combination claimed in claim 5 further comprising a pair of spaced brackets fixed to said supporting element, the lower one of said members being fixed to said brackets.

7. In a motor vehicle, the combination comprising body elements defining an open end of the vehicle, resilient end wall means mounted within said open end, said end wall means being capable of elastic deformation upon subjection to impact, deformable bracing means provided behind said elastic end wall means to take up thrust transmitted thereto upon collision, said elastic end wall means being provided with apertures for lights, and lights laterally spaced behind said elastic end wall means and behind at least part of said deformable bracing means.

References Cited in the file of this patent

UNITED STATES PATENTS

| | | |
|---|---|---|
| 2,031,168 | Kuhn | Feb. 18, 1936 |
| 2,104,182 | Best | Jan. 4, 1938 |
| 2,113,616 | Flogaus | Apr. 12, 1938 |
| 2,358,486 | Zeeb | Sept. 19, 1944 |
| 2,585,530 | Bennett | Feb. 12, 1952 |
| 2,829,915 | Claveau | Apr. 8, 1958 |
| 2,953,409 | Barenyi | Sept. 20, 1960 |

FOREIGN PATENTS

| | | |
|---|---|---|
| 496,209 | Italy | July 9, 1954 |